Aug. 24, 1965   F. L. NEIDLINGER   3,202,454
RETRACTABLE TARPAULIN COVER FOR OPEN-TOP
TRUCK BODIES AND THE LIKE
Filed June 13, 1963
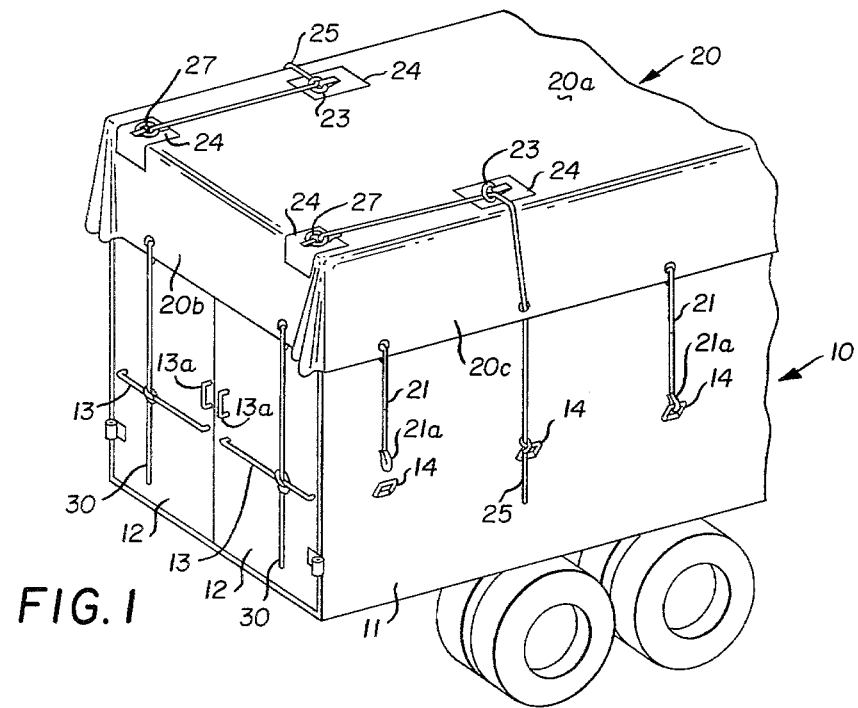
FIG. 1
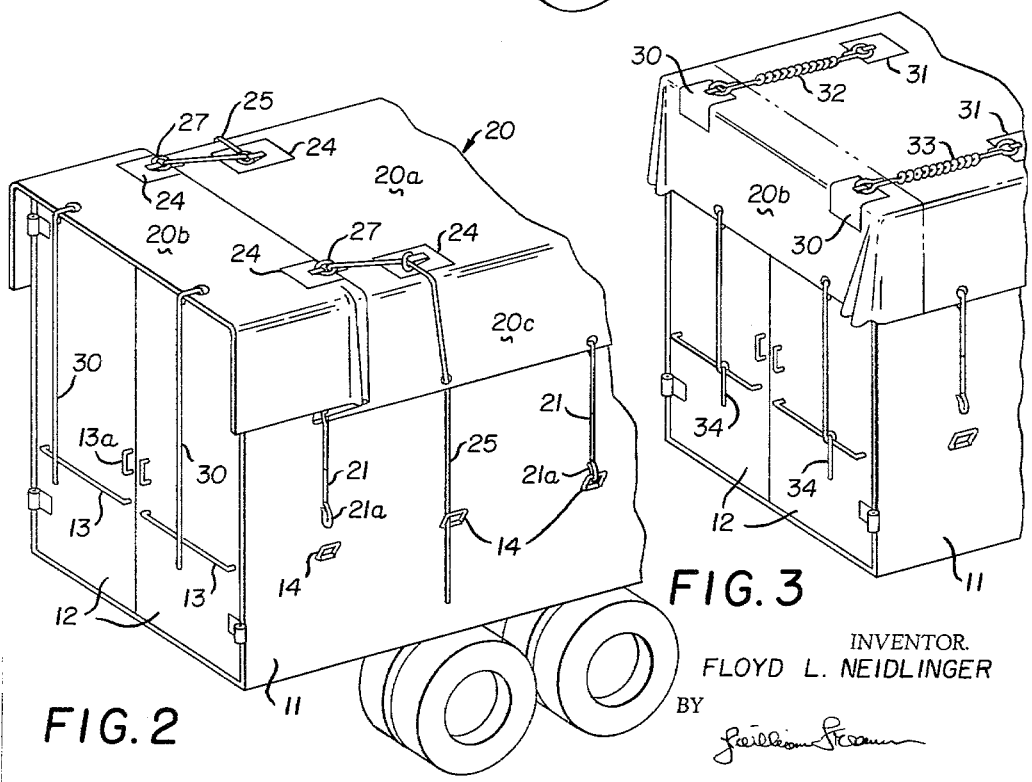
FIG. 2
FIG. 3
INVENTOR.
FLOYD L. NEIDLINGER
BY
ATTORNEY

United States Patent Office 3,202,454
Patented Aug. 24, 1965

3,202,454
RETRACTABLE TARPAULIN COVER FOR OPEN-TOP TRUCK BODIES AND THE LIKE
Floyd L. Neidlinger, 326 Loomis Ave.,
Cuyahoga Falls, Ohio
Filed June 13, 1963, Ser. No. 287,584
3 Claims. (Cl. 296—100)

This invention relates to the art of tarpaulin construction and in particular has reference to an improved tarpaulin for utilization with trailers, whereby the same may readily be moved from covering to uncovering position over the elevated back door portion of the trailer body.

In the trucking industry it has long been known that it is advisable to utilize tarpaulins in covering relationship to the top of semi-trailers, with such tarpaulins being constructed so that the same overlap the sides, front, and rear of the trailer.

Although tarpaulins of this type have proved satisfactory in normal operation, a disadvantage has been noted in regard to the difficulty encountered when it is desired to open and close the doors of the trailer. These doors are normally disposed at the rear of the trailer and conventional tarpaulins are constructed so as to overhang the top edges of the doors. Accordingly, it has been found that it is difficult to remove the tarpaulins from such covering relationship when the doors are to be opened, with the result that the operators normally will either tear the tarpaulin or if they do succeed in positioning the tarpaulin back from covering relationship with the doors, they will neglect to replace it upon closing the doors.

It has been found that if control ropes are attached to the tarpaulins adjacent the point of overhang of the rear doors and then passed through a forwardly disposed ring, and thence down over the side of a truck, that removal of the tarpaulin from covering relationship can be accomplished by the mere pulling of such ropes downwardly, with recovering being equally readily achieved by pulling on the normal tie ropes that depend from the lower edge of the tarpaulin.

Accordingly, production of a device having the above characteristics becomes the principal object of this invention with other objects thereof becoming more apparent upon a reading of the following brief specification, considered and interpreted in the light of the accompanying drawings.

Of the drawings:

FIGURE 1 is a perspective view, partly broken away, of a trailer with a tarpaulin placed in covering relationship to the rear doors.

FIGURE 2 is a perspective view similar to FIGURE 1 but showing the tarpaulin positioned in uncovered or retracted relationship with respect to the doors.

FIGURE 3 is a perspective view of a modified form of the invention.

Turning first to FIGURE 1 of the drawings, it will be noted that the trailer body generally designated by the numeral 10, is of conventional construction and accordingly, a detailed description of the same will not be presented except as is necessary to clarify the subject matter of this invention with the trailer.

In this regard, it will be noted that the trailer consists of sides 11, 11 to which are hinged rear doors 12, 12 with the rear doors 12, 12 each containing conventional tie rails 13, 13 that permit tying of the tie ropes in place, with handles 13a, 13a being also provided to facilitate opening of the same. Additionally, on the sides of the trailer are disposed a series of fastening members 14, 14, with these fastening members normally being pivotally secured to the trailer in known fashion to permit attachment of the tie ropes or the rope ends thereof as is well known in the art.

Turning next to a description of the improved tarpaulin generally indicated by the numeral 20, it will be noted that the same is of generally flat configuration so as to include a central portion 20a that has an area dimension approximately the area of the open top portion of the trailer 11, so as to form a covering for the same. Additionally, a front edge (not shown), a rear edge 20b and opposed side edges 20c, 20c bound the edges of the central portion 20a so as to cover the front, rear, and opposed sides of the trailer 10, with a series of side tie ropes or straps 21, 21 being normally provided with hooks 21a, 21a to secure the tarpaulin in place along the sides of the body 10. In this regard, it is merely necessary to engage the hooks 21a, 21a with the fastening members 14, 14 to thus insure that the tarpaulin will be securely attached at its sides to thus preclude transverse shifting of the tarpaulin, with it being noted that the front end of the trailer is also preferably provided with similar fastening members 14, 14 while the front end of the tarpaulin similarly has straps 21, 21 and hooks 21a, 21a provided thereon in proper position to permit the tarpaulin to be secured at the front portion thereof in the same manner as utilized on the sides.

Turning next to a more detailed consideration of the remainder of the tarpaulin structure, it will be noted that the rear portion of the same includes reinforcing pads or patches 24, 24 which are secured in known fashion to the tarpaulin itself in order to reinforce certain areas of the tarpaulin which incur considerable stress. In this regard, it will be seen from FIGURES 1 and 2 that a first pair of these reinforcing members 24, 24 are disposed forwardly of the rear edge of the tarpaulin, and further have secured thereto control or guide rings 23, 23, that are of a sufficient size to enable a control rope 25 to freely pass therethrough as shown in the drawings.

Additionally, it will be noted that a second pair of pads or patches 24, 24, are secured to the tarpaulin adjacent the rear edge thereof with this second set of pads 24, 24 having rings 27, 27 that may be tied with respect to the free end of the control ropes 25, 25 as shown in the drawings, with the longitudinal dimension of distance between pads 24, 24 being preferably slightly greater than the overhang of the edge 20b. Thus with the control ropes 25, 25 securely attached to the rings 27, 27 and then passed through the rings 23, 23 and then down over the side of the tarpaulin and trailer through a hole or grommet adjacent the lateral peripheral edges of the tarpaulin, the device is ready for use.

It is to be noted that while the free ends of the control ropes 25, 25 are shown depending downwardly through the tarpaulin edges on opposed sides of the body 10 in the preferred form of invention, that it is entirely possible that both such ropes could be played downwardly over the same side if desired, due to the transversely aligned relationship of the pads 24, 24.

Additionally, the tarpaulin preferably possesses additional rear tie ropes 30, 30 that are secured to the rear peripheral edge of the tarpaulin as shown, with the number of the ropes utilized in this regard being dictated by the size of the vehicle and various other conditions and with such ropes being tied to rails 13, 13 as indicated.

In use or operation of the improved tarpaulin, it will be assumed that the straps 21, 21 are all secured in place and that the tie ropes 25, 25, and 30, 30 have been tied down on the appropriate rail associated therewith. Accordingly, when it is desired to open the rear doors 12, 12, it is merely necessary to unhook the rearmost straps 21, 21 which is followed by untying of the ropes 25, 25 and 30, 30.

At this time, it will be seen that by simply pulling down on the ropes 25, 25 that the rear portion of the tarpaulin will be drawn upwardly and forwardly so as to uncover the rear doors and permit the same to be opened freely without any interference with the tarpaulin.

Further, when it is desired to close the doors, the same may merely be closed and the ropes 30, 30 grasped and pulled downward. This will pull the tarpaulin back into covering relationship with the doors and all of the ropes may be secured in place at that time as previously described. When this has been done, the trailer is once more secure from the weather and is in condition to move.

The modified form of the invention shown in FIGURE 3 envisions the use of tension means to retract the rear flap 20b, and accordingly, first and second pairs of pads 30, 30 and 31, 31 are shown longitudinally spaced from each other and interconnected by tension ropes 32, 32 that may be made to include spring members 33, 33 as shown in FIGURE 3 or alternatively may merely be stretch ropes of known type.

Since the tension ropes have a tendency to draw the rear flap up to the chain-dotted line position of FIGURE 3, it is mandatory that rear tie ropes 34, 34 be provided to retain the rear flap in covering position during use.

In operation, to open the rear doors, the ropes 34, 34 need merely be untied following which the tension ropes will retract the rear flap, whereupon the rear doors may be opened.

To cover the rear doors, the rear flap need merely be pulled in place by pulling on tie ropes 34, 34, which are then secured in place.

It will be seen from the foregoing that by utilization of the above described rope and ring combination there has been achieved a new and improved tarpaulin for use on trailers which can be easily operated by one man and which will facilitate ready removal of the rear portion of a tarpaulin to permit access to the rear doors of the trailer and will likewise replace the tarpaulin in covered relationship with the doors with minimal trouble.

While a full and complete description of the invention has been set forth in accordance with the dictates of the patent statutes, it is to be understood that the invention is not intended to be limited to the specific embodiment herein shown.

Accordingly, modifications of the invention may be resorted to without departing from the spirit hereof or the scope of the appended claims.

What is claimed is:

1. A retractable tarpaulin adapted for covering use on the open top portion of a trailer body having forward, rear, and side walls and at least one rear door, comprising:
    (A) a flat tarpaulin having
        (1) a central portion corresponding in area dimension to the area dimension of said open top portion of said trailer body, and
        (2) front, side and rear edge portions bounding said central portion and respectively depending downwardly into covering relationship with portions of said front, side and rear walls when said central portion of said tarpaulin is covering said open top portion of said truck body;
    (B) a series of tie ropes secured to the edges of said portions and adapted to secure said tarpaulin in place on said truck body;
    (C) and tarpaulin retracting means including,
        (1) longitudinally spaced guide rings secured to said tarpaulin in longitudinal alignment, and
        (2) a control rope having one end secured to said rearmost ring and being passed through said forwardmost ring with the free end of said rope being accessible from the ground adjacent one side of said trailer body, and
        (3) the longitudinal distance between said rings being slightly greater than the tarpaulin that overhangs said door
            (a) whereby movement of said rope forwardly will move said rear portion of said tarpaulin upwardly and forwardly of said rear portion and out of covering relationship with said rear door.

2. The device of claim 1 further characterized by the fact that the free end of said control rope passes through an edge of one said side portion of said tarpaulin in transverse alignment with said forwardmost guide ring.

3. The device of claim 1 further characterized by the presence of a second set of guide rings transversely aligned with said first guide rings and being associated with a second control rope that is secured to the rearmost second ring and passed through the forwardmost second ring with the free end thereof depending over one side wall of said truck for movement by an operator.

References Cited by the Examiner

UNITED STATES PATENTS

| | | | |
|---|---|---|---|
| 1,583,832 | 5/26 | Hoigaard | 135—14 |
| 2,443,478 | 6/48 | Reid | 296—100 |
| 2,807,499 | 9/57 | Duddlestone | 296—100 |
| 3,041,104 | 6/62 | Richard | 296—100 |

A. HARRY LEVY, *Primary Examiner.*